United States Patent [19]

Homme

[11] 3,766,320

[45] Oct. 16, 1973

[54] TELEPHONE ALARM SYSTEM

[76] Inventor: Truman K. Homme, 1524 Gorton Ave., Willmar, Minn.

[22] Filed: Sept. 16, 1971

[21] Appl. No.: 181,189

Related U.S. Application Data

[63] Continuation of Ser. No. 839,864, July 8, 1969, abandoned.

[52] U.S. Cl. .................................................. 179/5 R
[51] Int. Cl. .......................................... H04m 11/04

[56] References Cited

UNITED STATES PATENTS 3,582,555 6/1971 Kok.................................... 179/5 R

*Primary Examiner*—Ralph D. Blakeslee
*Attorney*—Harvey B. Jacobson et al.

[57] ABSTRACT

A solid state electronic system for sensing an emergency condition at a subscriber station and generating multiple coded signals impressed on telephone lines. A first code sequence which connects the subscriber station is located to a service headquarters. The second code sequence indentifies the location of the subscriber station thereby providing the service headquarters with sufficient information to respond. The codes are generated by an encoder utilizing a switching matrix controlled by logic circuitry for forming pulses compatible with telephone system data format.

10 Claims, 4 Drawing Figures

Truman K. Homme
INVENTOR.

BY Clarence A. O'Brien
and Harvey B. Jacobson
Attorneys

Truman K. Homme
INVENTOR.

BY Clarence A. O'Brien
and Harvey B. Jacobson
Attorneys

Truman K. Homme
INVENTOR.
BY Clarence A. O'Brien
and Harvey B. Jacobson
Attorneys

TELEPHONE ALARM SYSTEM

This is a continuation of application Ser. No. 839,864, filed July 8, 1969.

The present invention relates to data transmission and more specifically to an encoding system for generating information on telephone lines in response to detection of an alarming emergency condition at a subscriber station.

Due to the increasing rate of burglaries and fires which businesses and homes are experiencing, the need for efficient, reliable and immediate communication between a victimized location and an appropriate service, such as police and fire departments has prompted the design and construction of several automatic dialing systems which automatically alert an appropriate service of an existing emergency situation. Usually, these dialing encoders cooperate with conventional burglar and fire alarm sensors for initiating system operation. The systems generate appropriate signals for connecting a subscriber telephone set to central telephone lines. A pulse code is generated on the telephone lines to dial the telephone number of an appropriate service. Once the receiving station of the service responds to the call, a second code sequence is generated which identifies the caller allowing the service to respond appropriately.

Prior art constructions primarily depend upon mechanical components such as relays for effecting pulse generation. However, it has been found that the prolixity of components required for proper system operation decreases the inherent reliability of the system and may cause it to fail during a period of time when it is most needed. Further, many conventional systems employ recorded messages for imparting identification information from the subscriber station to the service headquarters. Such communication requires additional outlay of funds for a tape playback unit which also decreases the reliability of the over-all system.

The present invention is a solid state device using a minimum number of electro-mechanical components such as relays. The system includes solid state logic circuitry manifesting a high degree of reliability. Further, utilization of low cost components makes the present system feasible for a vast market thereby providing most homeowners and business owners with an effective menas for protecting their property.

The present system includes an encoder which generates a first code signal in response to the detection of an emergency situation. This code signal is impressed upon subscriber telephone lines and appears on the telephone lines as a regularly dialed number. The code represents the number of an appropriate service, such as the fire or police department. Upon answering at the receiver station, a second code signal is generated which represents the location making the call. The invention is adapted for use with a pulse code decoder at the receiving station which quickly translates the code of the calling station to the address of said calling station. The entire alerting process and conveyance of meaningful information to the responding service is momentary thereby permitting rapid response to the emergency call.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
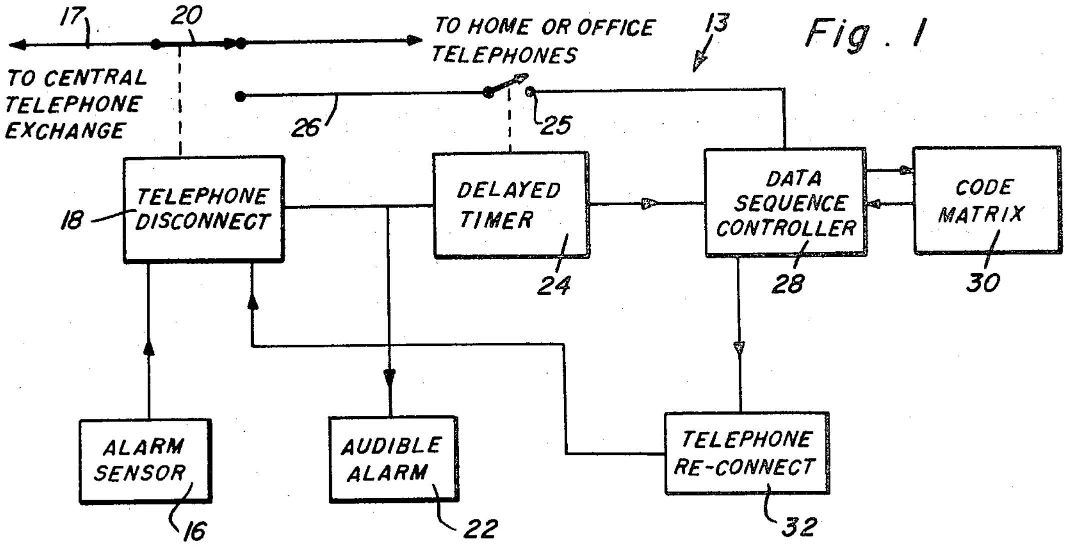
FIG. 1 is a block diagram representing the system of the present invention.

Referring to the drawings, and more particularly to FIG. 1 thereof, reference numeral 13 generally indicates the basic embodiment of the present invention which is connectible to the telephone line 17 of a subscriber station. The system includes an alarm sensor 16 which responds to an emergency condition and energizes telephone disconnect means 18 resulting in the clearing of the telephone lines. A switch 20 associated with disconnect means 18 then connects the transmission output line 26 of system 13 to the telephone line. Upon actuation of the alarm sensor 16, an audible alarm 22 is sounded to alert residents at the subscriber location of the emergency condition.

The basic operation of the present invention begins with the actuation of a delayed timer 24 which causes completion of a circuit between the transmission line 26 and a data sequence controller 28. The sequence controller causes a sequence of pulse codes to be generated by the code matrix 30 and impressed upon the transmission line 26 for communication to a service headquarters through the telephone lines. Actually, the code generated includes two principal sequences. The first sequence represents the telephone number of the service to be called. For example, if the alarm sensor 16 is suited for detecting fire, the code matrix is adapted to generate the telephone number of a local fire department. After answering of the telephone at service headquarters, a second sequence is generated which represents an identification code of the calling station. Switch means 32 is provided for returning the system to a normal connection between the telephone lines and the telephone sets at the subscriber's station.

Figure 2:
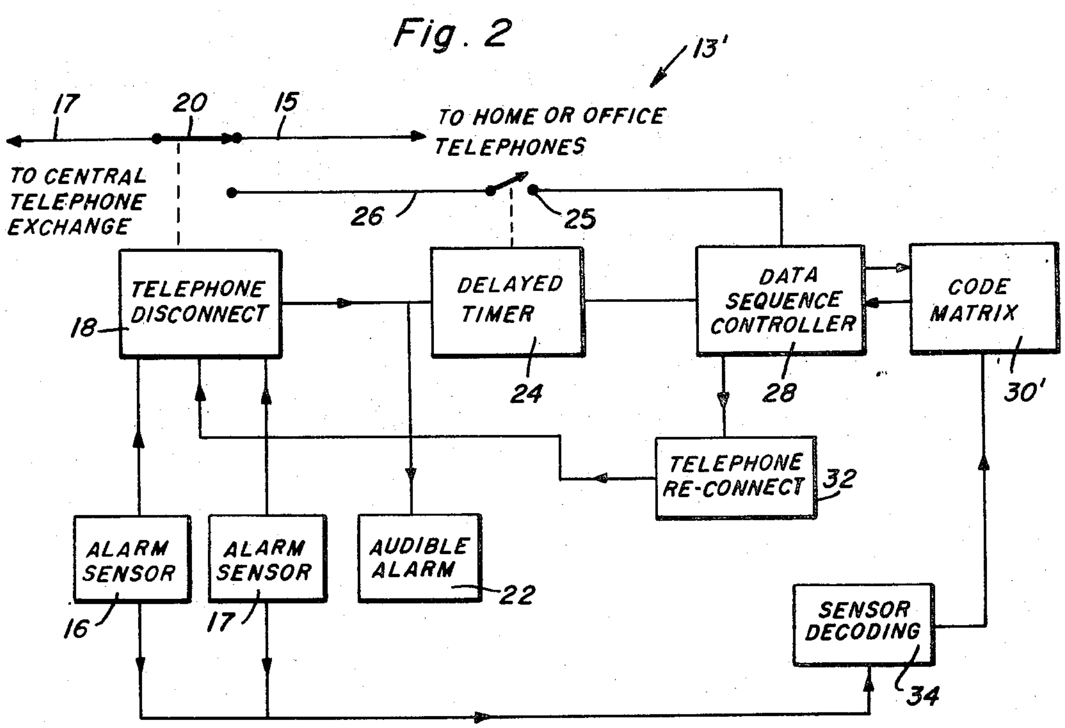
FIG. 2 is a block diagram of a system substantially identical to that illustrated in FIG. 1 with the inclusion of two different types of alarm sensors, with associated logic for causing the dialing of an appropriate service.

Referring to FIG. 2, the second embodiment of the present invention will be seen to include the basic structure of the first embodiment. However, the second embodiment is more elaborate in that it includes provision for a plurality of alarm sensor types. For example, a first alarm sensor 16 may sense fires and a second alarm sensor 17 may detect burglary. Sensor decoding means 34 are provided for determining which sensor is being energized and causes the dialing of an appropriate service telephone number. Otherwise, stated, if fire alarm sensor 16 is energized, the sensor decoding means 34 causes the dialing of the fire department number. On the other hand, should burglar alarm sensor 17 be actuated, the sensor decoding means 34 causes the dialing of the police department number.

Figure 3:
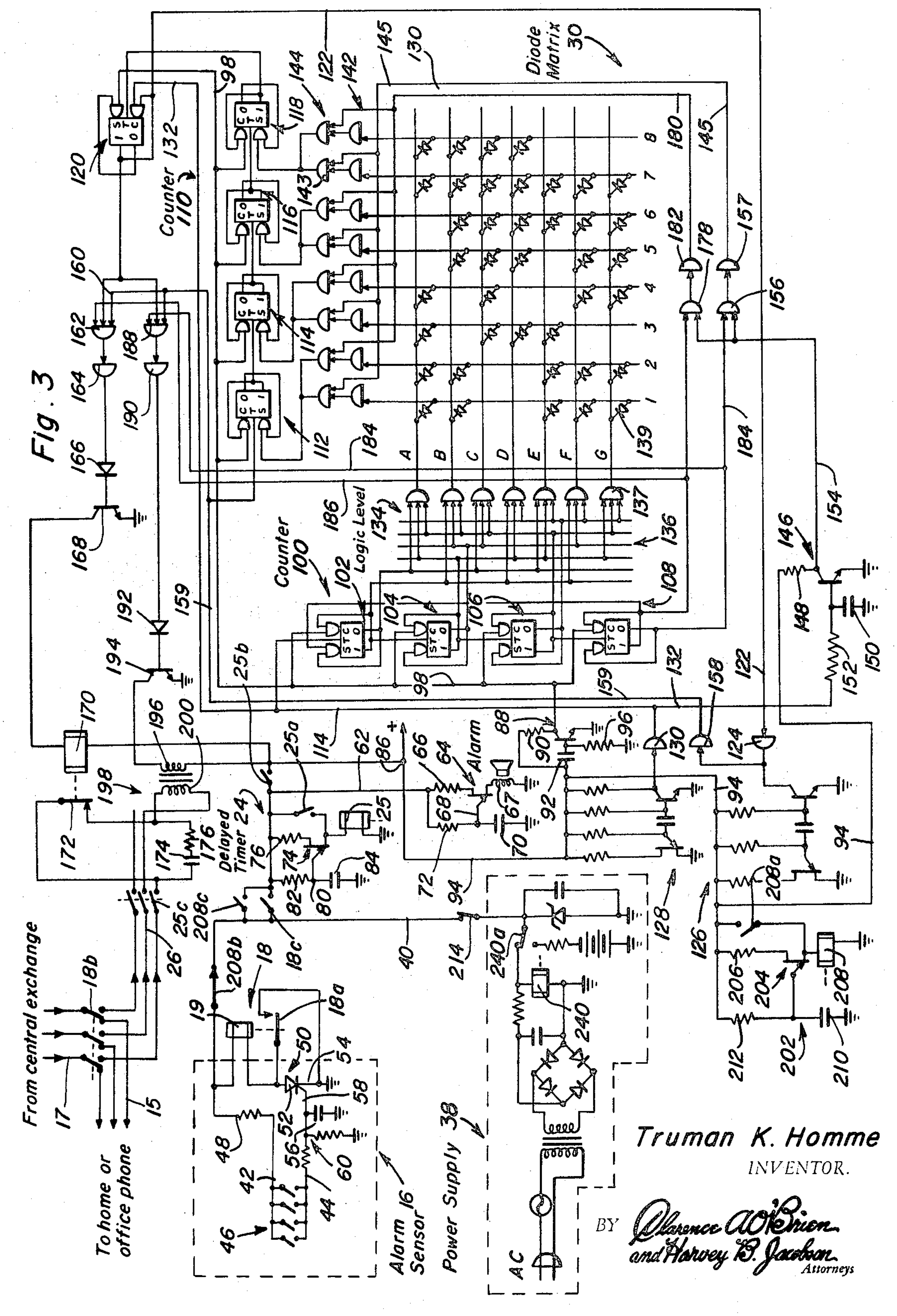
FIG. 3 is an electrical schematic diagram illustrating the system shown in block form in FIG. 1.

The basic form of the invention, shown in block form in FIG. 1, is more particularly illustrated in FIG. 3. The system includes a power supply generally indicated by reference numeral 38, which is explained in greater detail hereinafter. Suffice it to say that power supply 38 provides substantially d.c. voltage along output line 40 which distributes bias voltage and driving power to the components of the system.

The alarm sensor 16 is seen to include conductor wires 42 and 44 across which sensing transducers 46 are connected. The particular type of alarm transducer does not form a part of the present invention per se. However, in the instance where the alarm transducers are for detecting fire, they may be of the bi-metallic type which is commercially available. In the instance where the alarm transducers are for the purpose of detecting burglary, they may be of the photoelectric, balanced bridge or other detection devices now available on the market. The conductor line 42 is connected to the voltage distribution line 40 through a load resistor 48. Also included in the alarm sensor 16 is a silicon control rectifier (SCR) stage generally indicated by reference numeral 50 having an anode 52 connected to the voltage distribution line 40 through previously mentioned telephone disconnect means 18 which includes a relay coil 19. The cathode 54 of the SCR is grounded. The gate 58 of the SCR is connected to the ungrounded terminal of a charging capacitor 56 which is connected in parallel with the junction point between two resistors forming a voltage divider generally indicated by reference numeral 60. One end of the voltage divider is grounded, and the second end of the divider is connected to conductor 44.

In operation of the alarm sensor 16, closing of any alarm transducer causes charging of the capacitor 56. Upon attainment of the charging voltage, across the gate 58 of the SCR 50, the device fires thereby causing a heavy surge of current to flow through relay coil 19. In response to relay coil energization, a normally open relay switch 18*a* connected across the anode and cathode of the device, is caused to be closed thereby short-circuiting the anode and cathode which inhibits further firing of the SCR. The capacitor 56 forms an *r–f* bypass for preventing erroneous firing of the SCR due to spurious signals at the gate of the device. The voltage divider retains the gate at ground during the quiescent state of the alarm sensor. A second set of relay switches 18*b* are momentarily actuated to open the normally closed connection between the telephone lines 17 and the telephone sets at a subscriber's station upon energization of relay coil 19 which clears the lines. When actuated, switches 18*b*, are caused to make connection between the telephone lines at the subscriber station and the output transmission lines 26 of the present system. A third normally open switch 18*c*, associated with the relay coil 19 connects the alarm means 22 to the power supply upon energization of the relay to allow energization of alarm means 22.

Essential components of the alarm means 22 include a unijunction transistor 64 having a first drain connected to the voltage distribution line 40 through resistor 66, connecting lead 62 and relay swtich 18*c* to provide bias voltage to the transistor. The transistor is caused to oscillate by connecting the source terminal 68 thereof to an ungrounded terminal of a charging capacitor 70. A resistor 72 is connected between the conductor lead 62 and the ungrounded capacitor terminal thereby completing a capacitor charging path. When capacitor 70 charges to a charging value, the transistor 64 fires and provides a discharge path for the capacitor. After rapid discharge, the unijunction transistor 64 is cut off until the capacitor 70 once again charges to the charging voltage. A speaker coil 67 is connected to the second drain of the transistor so that an audible alarm may be sounded during oscillatory transistor firing upon closing of relay switch 18*c*.

Closing of relay switch 18*c* also results in the energization of a delayed timer 24 adapted to issue a pulse after a delay of between 30 and 90 seconds. The timer controls the length of time between telephone line disconnect and reconnection thereof to the system. The open circuit condition exists until switch means in the transmission lines 26 are closed in response to operation of timer 24, to permit communication along these lines. In greater circuit detail, the delayed timer 24 includes a unijunction transistor 74 having a first drain connected to bias distribution line 40 through a load resistor 76 upon closing of relay switch 18*c*. A second drain of the transistor is connected to ground through a relay coil 25. The gate of the transistor is connected to the junction point 80 between a bias resistor 82 and a charging capacitor 84 which is grounded. In operation, the unijunction transistor 74 functions in substantially the same manner as unijunction 64 of alarm means 22. In addition, relay normally open switch 25*a* is connected between the bias distribution line 40 through relay switch 18*c* and the second mentioned drain of the transistor so that upon energization of relay coil 25, a pulse is generated ans switch 25*a* effectively short circuits the transistor drains so that further firing of the transistor is terminated. A second normally open relay switch 25*b* is serially connected to relay switch 18*c* which completes a circuit from the voltage distribution line 40 to a junction point 86, the latter providing a power tap off for the electronic circuits described hereinafter, the oscillators 126 and 128 and reset timer 222. A third set of normally open relay switches 25*c*, are associated with the relay coil 25 and are closed upon firing of the delay timer 24. These in-line switches connect the code signalling system to the transmission line 26 and the telephone lines 17.

Upon closing of relay switch 25*b*, power is supplied to a pulse generator generally indicated by reference numeral 88 incorporating an NPN transistor connected in the common emitter configuration. The collector of the transistor is connected to the voltage tap-off point 86 through a load resistor 90. The base of the transistor is connected to the voltage tap-off point 86 through a coupling capacitor 92. The base is biased by a grounded resistor 96. The pulse generated by the transistor is coupled to subsequent logic circuitry through a lead 98, providing a clearing pulse to a logic circuitry.

The data sequence controller is denoted in FIG. 1 by refence numeral 28. The circuitry includes a first four-stage counter generally indicated by reference numeral 100 in FIG. 3. The stages of the counter are of conventional design indicated by reference numerals 102, 104, 106 and 108 respectively. As will be observed, each stage of the counter includes a modular flip-flop unit having gated set and clear input terminals. A third ungated triggering terminal is also provided. The binary 1 output terminal of the unit is fed back to the gated clear input and the binary 0 output terminal is fed back to the gated set input terminal. The binary 1 output terminal provides an output line for the stage. The modular flip-flop unit employed in the first stage of the counter 100 is employed in the remaining stages as well as in a second, five stage counter generally denoted by reference numeral 110. In each counter, the flip-flop modular units are interconnected between the binary 1 output terminal of one stage and the trigger input of the subsequent stage.

The stages of counter 110 are denoted by 112, 114, 116, 118, 120 respectively. The particular function of the counters 100 and 110 will be more fully discussed hereinafter. Suffice it to say at this point that a "clear" pulse generated by generator 88 appears along lead 98 is coupled to the gated clear terminal of each stage in counter 100 as well as the gated clear input terminals of the stages 112–118 of counter 110. The "clear" pulse appearing in lead 98 is coupled to the gated set terminal of the fifth stage 120 in counter 110 thereby setting the stage to a blocking condition. This prevents the transmission of erroneous information to the telephone line until proper initiation of an operational cycle.

The output of the stage 120 is coupled at the binary 1 terminal thereof to an oscillator 126 through conductor 122 and an inverter 124. Thus, when stage 120 is set, the oscillator 126 is prevented from operating. A three second oscillator generally indicated by reference numeral 128 produces timing pulses transmitted to the first stage 102 of counter 100 through an inverter 130, to control the duration of the intervals during which the code digits are encoded. The pulses are transmitted along distribution line 132. The distribution line extends to the gated clear input terminal of the stage 120 of counter 110 to cause resetting of the stage. Resetting of this stage initiates an operational cycle resulting in normal operation of the oscillator 126 which issues pulses or clock signals at a frequency of 10 cps. The particular construction of the oscillator 126 which serves as a system clock and oscillator 128 are explained in specific detail hereinafter.

A single level of gating logic 134 is associated with counter 100. A group of six bus wires generally indicated by 136 provides means for connecting the various stages of counter 100 to the logic level 134 which includes seven gates 137, each having three input terminals and a single output terminal. The stages of counter 100 are connected to the input terminals of the logic level gates in such a manner to sequentially cause unique binary outputs at the gates to form code data. As previously mentioned, the first pulse from the three second oscillator 128, appearing on distribution line 132 is coupled to the trigger input of the first stage 102 of counter 100 thereby setting the stage and causing the first gate in logic level 134 to assume a unique binary condition with respect to the other gates in the logic level.

As will be noted, the output from each gate in logic level 134 is designated by an alphabetical letter A–G to indicate seven output lines or rows. These output lines form the sequence control lines of the code matrix 30. The matrix columns are sequentially numbered from 1 to 8. Diodes 139 are connected between preselected rows and columns to complete the switching matrix. The switching matrix of the present invention is designed in accordance with conventional criteria, as set forth, for example, in "Digital Computer Design Fundamentals" by Chu, McGraw, Hill, 1962. In order to effect the present code, the diodes are arranged as follows:

TABLE I

| Column | Rows |
|---|---|
| 1 | ABEFG |
| 2 | ABEFG |
| 3 | ACDE |
| 4 | ACFG |
| 5 | CDEFG |
| 6 | BCDEFG |
| 7 | ABCDEFG |
| 8 | ABCD |

As will be noted, the diodes are arranged so that their respective anodes are connected to associated columns while the cathodes are connected to associated rows. The rows A–G provide control pulses for allowing the transmission of segmental data words through columns 1–8 to subsequent logic circuitry 144 hereafter described. The data words represent the digits of a telephone number of a service headquarters to be called by the subscriber station. As the rows A–G singularly and sequentially assume a voltage potential lower than preselected columns, the associated diodes will be forward biased thereby permitting the transmission of data through those columns of the matrix. As each of the rows A–G are actuated, another digit of the telephone number is generated. Inasmuch as the conventional telephone number includes seven digits, seven control lines (A–G) are provided. It is to be emphasized at this point, that only data columns 1, 3, 5, and 7 transmit a first code sequence for effecting the dialing of the number to be called. After transmission of this data, a second code sequence appearing on columns 2, 4, 6 and 8 is transmitted for the purpose of identifying location of the caller, at the receiving station. Means for storing the data on columns 1–8 does not form a part of the present invention per se. However, such storage may include storage registers, punched cards, magnetic tape or other suitable data carriers.

The output terminals of the columns are connected to the input of respective inverters 142 for complementing the code transmitted through the matrix. The output from each inverter is connected to a subsequent gate 143 forming a single level of logic generally indicated by 144. Each gate 143 in this logic level includes an input terminal across which enabling pulses appear at predetermined times in an operational cycle. The input terminals associated with columns 1, 3, 5 and 7 are connected to a distribution lead 145 which conduct an enabling pulse to the gates 143 in logic level 144 for permitting the transmission of data through the matrix. The enabling pulse is generated by a pulse generator generally indicated by reference numeral 146 which includes an NPN transistor connected in a common emitter configuration. The transistor includes a collector connected to the bias distribution line 94 through a load resistor 148. The base of the transistor is connected to ground through a charging capacitor 150. The base is also connected to the three second oscillator 128 at the oscillator output or distribution line 132 through resistor 152. The output lead of the pulse generator 146 is indicated by 154 and is connected to a first input terminal of a gate 156. The input terminal to gate 156 is connected to the binary 0 output terminal of stage 108 of counter 100. When a pulse appears on line 154, gate 156 is enabled and the pulse passes therethrough and is inverted through an inverter 157. After inversion, the pulse is transmitted to the appropriate gates in logic level 144 through a lead 145. It will be noted that the pulse generator 146 is designed to permit a slight delay of the pulse after initial energization of the generator, after which time information transmission through the matrix occurs. The passage of data through columns 1, 3, 5 and 7 and through logic levels 142 and 144 result in the setting of the four stages 112, 114, 116 and 118 of counter 110. Initially, the stages of this counter will sequentially store binary bits representing the digits of the number to be dialed. However, the same stages will store the binary bits representing an identification code of the caller when that code is subsequently generated. As will be appreciated, the logic levels 142 and 144 serve to control the timing of data taransmission to counter 110.

During operation of the 10 cps. oscillator 126, output pulses are impressed on distribution line 159 after inversion by an inverter component 158. These pulses are transmitted to the trigger input terminal of the input stage 112 of counter 110. These pulses serve to read out the data set in counter 110. Further, the distribution line 159 is connected to a first input terminal 160 of a three input gate 162 followed by an inverter 164 which controls distribution of data to the telephone lines. The output from inverter 164 is coupled to the anode of a diode 166 which serves to prevent spurious noise transmission. The diode 166 is serially connected to the base of an NPN transistor 168 connected in a common emitter configuration. The collector of the transistor is serially connected to relay coil 170 to form a series path through relay switch 25*b*. As pulses are read out from the four stages 112, 114, 116 and 118 of counter 110, the pulse information is gated through logic elements 162 and 164 after passing through the gating stages 120 of the counter 110. As each pulse from counter 110 is applied to transistor 168, amplified current flows through relay coil 170 causing sequential make and break contact of relay switch 172 associated with relay coil 170. It is the opening and closing of this relay switch which simulates a dialed number on the transmission lines 26 causing the ringing of a called station. A storage capacitor 174 and a serially connected resistor 176 is connected across the switch 172. During periods when switch 172 is opened, capacitor 174 stores a charge which becomes discharged through switch 172 upon the closing thereof. This action causes pulse flow through switch 172 simulating manually dialed pulses. It will be noted that due to oscillator 126, the pulse train generated on the transmission lines 26 will include pulses having a frequency of 10 cps., in conformance with standard telephone signals. These pulses will be transmitted over telephone lines 17 to the central exchange for causing connection of the subscriber station to the service headquarters having the number called.

As previously mentioned, while the first stage 102 of counter 100 is set, pulses will be generated on the transmission lines 26 which represent the first digit of a telephone number called. The second pulse from the three second oscillator 128 causes the resetting of the first stage 102 and the setting of the second stage 104 of counter 100. The transmission of data from the diode matrix 30 through counter 110 is repeated so that the second digit of the telephone number called is transmitted across transmission lines 26. The sequence is repeated until stages 102, 104 and 106 have gone through a cycle including binary 1 through binary 7 thus enabling seven digits to be generated across the transmission lines 26. The eighth pulse from the three second oscillator 128 sets the fourth stage 109 of the counter 100. By setting this stage, gate 156 is disabled thereby preventing further transmission of data through the matrix columns 1, 3, 5 and 7. However, the setting of stage 108 of counter 100 causes the enablement of gate 178 which transmits an inverted logic level to lead 180 through an inverter 182. The enabling lobic level is transmitted along lead 180 to the gates 142 of logic level 144 associated with the even numbered data columns 2, 4, 6 and 8. The binary 0 output terminal of the fourth stage 108 of counter 100 is connected to a lead 184 having the opposite end thereof connected to the first input terminal of a three input gate 188. By setting the fourth stage 108, an enabling logic level is transmitted to the gate 188 which places this gate in an open condition. Setting fourth stage 108 conversely disables the aforementioned gate 162 by transmitting a disabling logic level through lead 186 connected at the opposite end thereof to an input terminal of the gate 162. Thus, the setting of fourth stage 108 will be seen to cause switching action from gate 162 to gate 188 thereby opening a transmission path through gate 188 and closing the previous transmission path utilized in connection with gate 162. Gate 188 is followed by an inverter 190 having an output serially connected with a diode 192 and a transistor 194 similar to the components 166 and 168 previously discussed. It should be remembered that the latter mentioned transmission path through transistor 194 is for the purpose of transmitting the second code sequence appearing on the even numbered data lines (2, 4, 6 and 8), representing an identification code to inform the receiving station as to the caller's identity.

Transmission of data through the even numbered data columns to counter 110 is identical to that previously discussed in connection with the data representing the number to be called. However, rather than the data passing through the transmission path including relay coil 170, the identification code data passes through transistor 194 which amplifies pulse current through the primary 196 of a coupling transformer 198. The secondary winding 200 of the transformer is serially connected with the transmission lines 26 so that pulses are coupled to the transmission lines 26 by the transformer 198. During generation of an identification code, the counters 100 and 110 go through the same sequence as for the dialing sequence and seven digits governed by data columns A–G are generated. A unijunction timer generally indicated by reference numeral 202 is set for a time interval that permits a message including the dialing code and identification code sequences to be transmitted across the telephone lines. At the termination of the timing interval, the unijunction timer 202 causes system reset.

The complete structure of timer 202 includes a unijunction transistor 204 having a first drain terminal connected to bias line 94 through a load resistor 206. The second drain terminal is connected to ground through a relay coil 208. This coil is associated with relay switches hereinafter discussed. The charging capacitor 210 is connected between the source terminal of the transistor and ground. A source biasing resistor 212 is connected between the source of the transistor and the bias line. The timer 202 becomes initially energized upon closing of relay switch 25*b* and after a preselected time interval, charging capacitor 210 reaches a charging voltage which causes the firing of the unijunction transistor 204. The charging current through relay coil 208 causes the closing of normally open relay switch 208*a* connected between the bias line and the second mentioned drain of the unijunction transistor.

Upon closing of this relay switch, the unijunction is extinguished and prevented from further firing. Energization of relay coil 208 further causes the reconnection of telephone line switches 18*b* to an initial position by opening normally closed relay switch 208*b* and deenergizing the relay coil 19 whereby the telephone lines to the central exchange are connected to the telephone sets at the subscriber station. However, energization of relay coil 208 closes normally open relay switch 208*c* in order to maintain line 40 connected to the audible alarm 22 which continues to sound an alert and to delay timer 24 until a reset button 214 connected in line with power distribution lead 40 is opened. The timers 24 and 202 are then reset and the relay coils 25 and 208 deenergized. A further alarm reset is required, namely, the clearing of the alarm transducer which initially caused operation of the system.

POWER SUPPLY

Figure 4:
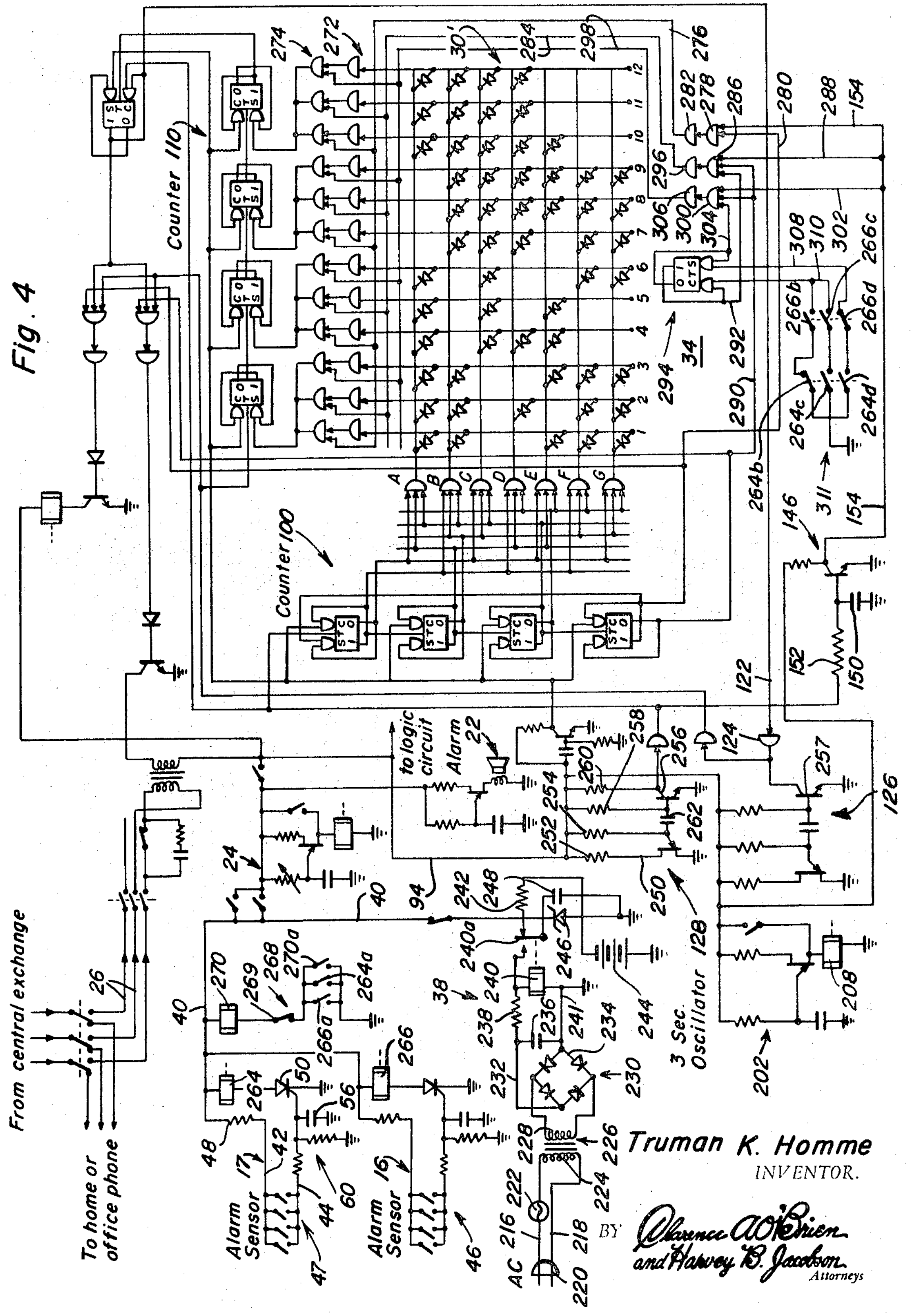
FIG. 4 is an electrical schematic diagram of the alternate embodiment shown in block form in FIG. 2.

Referring to FIG. 4, the power supply 38 which is the same in FIG. 3, includes input leads 216 and 218 connected to an available source of a.c. voltage through fuse 222 and a plug 220. The leads are connected across the primary winding 224 of a transformer 226 of the step down voltage type having a secondary winding 228 connected across the input terminals of a diode rectification bridge 230. The output terminals of the bridge are connected to leads 232 and 234 which provide an input to a filter including a capacitor 236 connected across the leads 232 and 234. A resistor 238 is connected at one end to a terminal of the capacitor 236. The second terminal of the resistor 238 is connected to a first terminal of an inductance in the form of a relay coil 240. The opposite terminal is grounded. A conductor 241 connects ground with the lead 234 of the bridge 230. A relay switch 240*a*, associated with relay coil 240, is of the single pole-single throw type including two stationary terminals and a contact arm terminal. A first stationary terminal is connected to the junction between resistor 238 and relay coil 250. The second stationary terminal of the switch 240*a* is connected to a series branch including resistor 242 and a grounded battery. The purpose for including a battery is that in the event the a.c. power is interrupted, a self-contained source of voltage is provided to permit service by the system. If for any reason a.c. power is interrupted, relay 240 becomes deenergized ad switch 240*a* is caused to be switched by biasing means (not shown) to a position as shown in FIG. 4 whereby d.c. current can conduct along distribution lead 40 from battery 244. The contact arm terminal is connected to ground through a parallel combination of a voltage regulating Zener diode 246 and a storage capacitor 248. The voltage required by the system depends upon the type of logic circuit used and the power requirements of relay utilized.

THREE SECOND AND 10 CPS OSCILLATORS

The three second oscillators 128 and the 10 cps. oscillator 126 are standard unijunction oscillators. The function of the three second oscillator is to set the time between transmission of digits either for generation of the dialing code or for the identification code. The function of the 10 cps. oscillators 126 is to provide pulses at a rate compatible with those transmitted over standard telephone lines. Pulses from the 10 cps. oscillator are utilized by the logic circuitry of the present system for reading out the dialing data and identification code data from counter 110.

Inasmuch as the oscillators are substantially identical in construction, the structure will be discussed with reference to the three second oscillator 128 shown in FIG. 4. The oscillator includes a unijunction transistor 250 having a first drain connected to a bias line 94 through a load resistor 252. The other drain of the transistor is grounded. The source of the transistor 250 is connected to the bias line through a second load resistor 254. The source is connected to the first terminal of the charging capacitor 262. The opposite terminal of the capacitor is connected to the d.c. bias line through a load resistor 258. The junction between the capacitor 262 and 258 is connected to the base of an NPN transistor 256 connected in the common emitter configuration. The resistor 258 serves to bias transistor 256. The collector of the transistor 256 is connected to the bias line through a bias resistor 260. The purpose of the transistor is to shape the pulses generated by the unijunction transistor after the charging capacitor 262 charges to a voltage sufficient to fire the unijunction transistor 250.

The structure of the 10 cps. oscillator 126 differs from that of the oscillator 128 by the exclusion of a load resistor 260 connected to the collector of transistor 256. Instead, the collector of the transistor 257 associated with the 10 cps. oscillator 126 is connected to the output of an inverter gate 124 so that the output of the 10 cps. oscillator can be gated off as required, between operation cycles.

As previously discussed in connection with FIG. 2, the second form of the present invention denoted by reference numeral 12( is substantially identical to the basic system of FIG. 1 with the addition of another type of alarm sensor 17. By using two alarm sensor types, more extensive protection for property may be realized. For example, alarm sensor 16 may be for the purpose of detecting fire and the alarm sensor 17 for the purpose of detecting burglary. Sensor decoding means 34 detects which of the alarm sensors have been actuated in an emergency situation and causes the dialing of an appropriate service headquarters.

The electronics for achieving these ends may be better understood by referring to FIG. 4. Alarm sensors 16 and 17 will be seen to be identical. In the case of alarm sensor 17, a relay coil 264 is connected in the anode circuit of the silicon control rectifier 50. A separate relay coil 266 is connected to the anode of the silicon control rectifier associated with alarm sensor 16. A parallel connected circuit branch 268 is connected between the bias distribution line 40 and ground which includes a relay coil 270 serially connected through a multiplicity of parallel connected grounded switches. The normally open relay switch 264*a* becomes closed when SCR 50 is biased thereby causing current to flow through associated relay coil 264. The normally open relay switch 266*a* becomes closed in response to energization of relay coil 266 associated with alarm sensor 16. A third parallel connected relay switch 270a is associated with relay coil 270. Thus upon the actuation of alarm sensors 16 or 17, one of the switches connected in the power connected branch 268 becomes closed thereby permitting the flow of current through the branch energizing relay coil 270 connected therein. Once the coil 270 is energized, switch 270*a* remains closed after firing of the SCR associated with the actuated alarm sensor. After final termination of an operational cycle, a normally closed reset relay switch 269 serially connected with relay coil 270 is opened by energization of the relay coil 208 in timer 202 thereby resetting the parallel connected branch 268 to an initial condition.

In order to permit the generation of unique codes capable of causing the dialing of two distinct services, for example fire and police departments, the diode matrix must be expanded. As will be noted from FIG. 4, the number of data columns have been increased from eight to twelve in number for the diode matrix 30′. The arrangement of diodes in the matrix are tabulated as follows:

TABLE II

| Column | Rows |
|---|---|
| 1 | ABEFG |
| 2 | ABDFG |
| 3 | ABEFG |
| 4 | ACDE |
| 5 | ACE |
| 6 | ACFG |
| 7 | BCDFG |
| 8 | BCDEFG |
| 9 | BCDEFG |
| 10 | ABCDE |
| 11 | ABCD |
| 12 | ABCD |

A single level of inverter circuitry generally indicated by reference numeral 272 includes 12 inverters for handling the compliment of data transmission through each of the columns. The output of each inverter is fed to an associatively connected gate, the plurality of gates forming a single level of logic circuitry generally indicated by reference numeral 274, is similar to the logic level 144 in connection with the basic system of FIG. 3. The operation of the diode matrix and the logic level 274 are substantially identical to those previously discussed in connection with the first form of the invention. However, data columns 2, 5, 8 and 11 are associated with alarm sensor 17 while data columns 3, 6, 9 and 12 are associated with alarm sensor 16. These data lines generate the dialing code for connecting the system with the service appropriate for the particular type of emergency situation. As in the first form of the invention, the first data sequence generated by the system represents the number to be called or dialed. The second subsequent sequence generated by data columns 1, 4, 7 and 10 represent the identification code of the calling station.

With more particular emphasis on the logic control lines shown in FIG. 4, a signal lead 276 is connected to the gates in logic level 274 associated with data columns 1, 4, 7 and 10. When an appropriate logic level appears on the lead 276, passage of data representing an identification code is transmitted through the diode matrix. The appropriate logic level is gated through a gate 278 having a first input connected to signal lead 280 which is connected at the opposite end thereof, to the binary 1 output terminal of the fourth stage of counter 100. A second input of the gate 278 is connected to the pulse generator 146 through a signal line 154. When a pulse appears on this line, gate 278 is enabled to allow enablement of gate 278. The output of this gate is connected to an inverter 282 for the purpose of conforming the pulse to a proper logic voltage which is then transmitted by signal lead 276. A second signal lead 284 is connected to input terminals of gates in logic level 274 associated with data columns, 2, 5, 8 and 11. When an appropriate logic level appears on this line, a dialing data code associated with one of the alarm sensors is transmitted through the diode matrix to counter 110. Production of the appropriate logic level requires actuation of a three input gate 286 serially connected to signal line 284 through inverter 296. One of the inputs of the gate 286 is connected to a signal lead 288 which is in turn connected to the output of the pulse generator 146. A timing pulse from the pulse generator 146 will produce a proper logic level at one of the inputs of the gate 286. The second input to this gate is connected to the binary 0 output of the fourth stage of counter 100 through connecting lead 290. The third input to the gate is connected to the binary 1 output of a control flip-flop unit 294 through a connecting lead 292. Setting and resetting of this flip-flop unit is caused in response to actuation of the alarm sensors 16 and 17 as hereinafter explained. The output from gate 286 is coupled to the signal lead 284 through an inverter 296 for transmission to the logic level 274.

Transmission of the dialing data code through the diode matrix 30′ in response to the alarm sensor associated with data columns 3, 6, 9 and 12 causes generation of the proper logic voltage level in signal lead 298 which is serially connected to a three input gate 300 through inverter 306. The first input of the gate is connected to the binary 0 output of the flip-flop unit 294. Gate 300 and inverter 306 operate in an identical manner to gate 286 and inverter 296 previously described. Thus, the second input to the gate 300 is also coupled to the pulse generator 146 through connecting lead 302. The third input to the gate is connected in parallel with similar input to gate 286 for final termination at the binary 0 output of the fourth stage of the counter 100, through connecting lead 290. As will be observed from FIG. 4, and bearing in mind the discussion just presented, a proper logic voltage level will appear on either line 284 or 298 in response to actuation of an associated alarm sensor. The transmission of the dialing code followed by the identification code across transmission lines 26 occurs in an identical manner to that previously discussed in connection with the basic form of the invention.

The control flip-flop unit 294 selectively enables gate 286 or gate 300 in accordance with the alarm sensor actuated. In effect, flip-flop unit 294 forms the heart of the sensor decoding means 34 illustrated in FIG. 2. The gated set input terminal of the flip-flop unit 294 is connected to lead 308 while the gated clear or reset input terminal of the flip-flop unit is connected to lead 310. A relay switch assembly generated as indicated by reference numeral 311 is connected across the leads 308 and 310 and causes switching of the flip-flop 294 in accordance with the particular alarm sensor actuated during an emergency.

The switch assembly 311 more particularly includes three mechanically ganged single-pole, single-throw switches that are actuated in response to current flow through relay 264 of alarm sensor 17. The first switch 264*b* is normally closed while second and third switch 264*c* and 264*d* are normally opened. The switch section 264*c* is connected to ground. A second mechanically ganged, single-pole, single-throw switch section is connected to the first switch section. The second switch section is actuated in response to the flow of current to relay 266 associated with alarm sensor 16. A first normally opened switch 266*b* is serially connected to 264*b*, a normally opened switch 266*c* is connected to the switch 264*c* and a third normally closed switch 266*d* is serially connected to the switch 264*b*. In addition, stationary contact of switch sections 266*b* and 266*c* are connected in parallel to the gated clear input terminal of the flip-flop unit 294. The stationary contact of switch 266*d* is connected to the set gated input terminal of the flip-flop unit 294. Thus, the logic function of the switch assembly 311 is such as to cause energization of data columns 2, 5, 8 and 11 in response to actuation of relay switches 266*b*, 266*c* and 266*d*. The actuation of relay switches 264*b*, 264*c* and 264*d* causes energization of data columns 1, 4, 7 and 10.

The fourth stage of counter 100 operates in the same manner previously discussed in connection with the first form of the invention. This stage enables all data columns except 1, 4, 7 and 10 to become actuated during transmission of an identification code.

With the exception of the additional circuitry discussed in connection with the second form of the present invention, operation is substantially the same manner as previously described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An encoding system for generating sequential binary data for transmission on communication lines, the system comprising condition sensing means responding to a predetermined condition for causing momentary open circuiting and clearing of the communication lines, delay means responsive to actuation of the sensing means for connecting the system to the communication lines after a preselected interval, control switch means enabled in response to the termination of the interval for initiating an operational cycle, first timing means responsive to actuation of the delay means for establishing system clock signals, data sequence controller means connected to the first timing means for changing state under control of said clock signals, gated means for generating binary data, storage means for receiving the binary data distributed by the gated generating means, logic means for connecting the controller means to the gated generating means for enabling sequential data distribution to the storage means in response to said changes in state of the controller means, second timing means connected to the storage means and energized by the first timing means for causing readout of the sequentially stored data, and signal coupling means connected to the storage means for transmitting the sequentially stored data to the communication lines.

2. The system set forth in claim 1 wherein the sequence controller means includes a multi-stage counter for assuming a plurality of unique binary conditions in response to successive clock signals, each of the binary conditions permitting the transmission of another data sequence by the gated generating means.

3. The system set forth in claim 2 wherein the communicating lines constitute telephone lines and wherein the transmitted data includes the representation of a telephone number to be called.

4. An alarm system for alerting a distant service of an emergency condition existing at a subscriber station through telephone lines, the system comprising sensor means for detecting an emergency situation, disconnect means responsive to actuation of the sensor means for momentarily disconnecting and clearing the telephone lines at the subscriber station, a source of voltage, time delay means energized in delayed response to operation of the disconnect means for delivering power from the source to the system, clock means responsive to energization of the time delay means for establishing clock signals, data sequence controller means set in sequential binary states by said clock signals, gated switch means controlled by the clock signals for sequentially generating binary data representing digits of a telephone number to be dialed, storage means for receiving the binary data distributed by the gated means, logic means for connecting the sequence controller means to the gated switch means for enabling data distribution to the storage means, and timing means connected to the storage means and energized by the clock means for causing readout of the stored data under control of the clock signals at a frequency rate compatible with central exchange requirements to effect proper dialing.

5. The system set forth in claim 4 wherein the gated switch means includes a diode switch matrix performing a first sequence of logic functions for causing the generation of digits representing a number to be called by the subscriber station, and means for causing repeated sequential operation of the sequence controller means for producing a second data sequence indicative of an identification code associated with the subscriber station which informs a receiving service headquarters of the location of the emergency situation.

6. The system set forth in claim 5 together with alarm means connected to the disconnect means for issuing a distinctive alert in response to an emergency.

7. The system set forth in claim 4 together with additional sensor means for detecting a second type of emergency, and logic means for causing generation of binary data representing digits of the telephone number of the service headquarters appropriate for the emergency.

8. The system of claim 4 including alarm means triggered into operation in response to said actuation of the sensor means, relay means responsive to distribution of power to the clock means for connecting the alarm means to the telephone lines and reset means for reconnecting the telephone lines at the subscriber station upon termination of readout of stored data.

9. An encoding system for generating sequential binary data for transmission on communication lines, the system comprising condition sensing means responding to a predetermined condition for causing momentary open circuiting and clearing of the communication lines, means responsive to actuation of the sensing means for connecting the system to the communication lines, a control switch means operative in response to actuation of said connection means for initiating an operational cycle, first timing means responsive to actuation of said connection means for establishing system clock signals, data sequence controller means connected to the first timing means for changing state under control of said clock signals, gated means for generating binary data, storage means for receiving the binary data distributed by the gated generating means, logic means for connecting the controller means to the gated generating means for enabling sequential data distribution to the storage means in response to said changes in state of the controller means, second timing means connected to the storage means and energized by the first timing means for causing readout of the sequentially stored data, and signal coupling means connected to the storage means for transmitting the sequentially stored data to the communication lines.

10. The system set forth in claim 9 together with additional condition sensing means each responsive to a different predetermined condition at the subscriber station and additional logic means responsive to the condition sensing means for causing generation by the data generating means of a first sequence of binary data representing the telephone number of the service corresponding to the appropriate predetermined condition.

* * * * *